US010655707B2

(12) United States Patent
Mangiaracina

(10) Patent No.: US 10,655,707 B2
(45) Date of Patent: May 19, 2020

(54) GEARBOX FOR AGRICULTURAL AND INDUSTRIAL VEHICLES

(71) Applicant: CARRARO S.P.A, Campodarsego (PD) (IT)

(72) Inventor: Enrico Mangiaracina, Padua (IT)

(73) Assignee: CARRARO S.P.A., Campodarsego (PD) (IT)

(*) Notice: Subject to any disclaimer, the term of this patent is extended or adjusted under 35 U.S.C. 154(b) by 381 days.

(21) Appl. No.: 15/569,003

(22) PCT Filed: Apr. 29, 2016

(86) PCT No.: PCT/EP2016/059612
§ 371 (c)(1),
(2) Date: Oct. 24, 2017

(87) PCT Pub. No.: WO2016/174202
PCT Pub. Date: Nov. 3, 2016

(65) Prior Publication Data
US 2018/0128350 A1 May 10, 2018

(30) Foreign Application Priority Data
Apr. 30, 2015 (IT) .......................... 102015000013572

(51) Int. Cl.
*F16H 3/00* (2006.01)
*B60K 17/28* (2006.01)
(Continued)

(52) U.S. Cl.
CPC ............. *F16H 3/006* (2013.01); *B60K 17/28* (2013.01); *F16H 3/097* (2013.01);
(Continued)

(58) Field of Classification Search
CPC ................................ F16H 3/006; F16H 3/097
See application file for complete search history.

(56) References Cited

U.S. PATENT DOCUMENTS 3,152,491 A * 10/1964 Wiggermann .......... F16H 3/006
475/219
3,783,985 A * 1/1974 May ...................... B60W 10/02
192/3.54
(Continued)

FOREIGN PATENT DOCUMENTS

EP 2126409 9/2011
WO WO 2005/021999 8/2004

OTHER PUBLICATIONS

International Search Report for corresponding PCT Application No. PCT/EP2016/059612 dated Jul. 7, 2016.

*Primary Examiner* — Terence Boes
(74) *Attorney, Agent, or Firm* — Caesar Rivise, PC

(57) ABSTRACT

A gearbox (1) for agricultural and industrial motor vehicles comprises an input shaft (2) and an output shaft (3), a first clutch (12) and a second clutch (13) arranged in a position between the first and second transmission shafts (16, 17), the first and second transmission shafts both being hollow. The gearbox further comprises a first intermediate shaft (20) and a second intermediate shaft (21), the first intermediate shaft extending coaxially inside the second intermediate shaft. A first engaging device (22) is capable of selectively connecting the first intermediate shaft to the output shaft, a second engaging device (23) is capable of selectively connecting the second intermediate shaft to the output shaft and a third engaging device (24) alternately connects the second intermediate shaft to the first intermediate shaft or to the output shaft. The first engaging device and second engaging device are coaxial with the output shaft. The third engaging device is coaxial with the first and second intermediate shafts and is interposed in an axial position between the first and second engaging devices.

5 Claims, 9 Drawing Sheets

(51) Int. Cl.
*F16H 3/097* (2006.01)
*F16H 3/093* (2006.01)

(52) U.S. Cl.
CPC .............. *F16H 2003/0933* (2013.01); *F16H 2200/0004* (2013.01); *F16H 2200/006* (2013.01)

(56) References Cited

U.S. PATENT DOCUMENTS

| | | | |
|---|---|---|---|
| 4,777,837 A | | 10/1988 | Lehle |
| 4,831,894 A | * | 5/1989 | Braun ..................... F16D 21/04 192/48.609 |
| 4,876,924 A | * | 10/1989 | Fletcher ................. F16H 3/095 74/745 |
| 5,009,116 A | * | 4/1991 | Ordo ....................... F16H 3/097 74/330 |
| 5,642,643 A | * | 7/1997 | Reynolds ............... B60K 17/28 74/331 |
| 7,377,191 B2 | | 5/2008 | Gitt |
| 2007/0214903 A1 | | 9/2007 | Forsyth |
| 2015/0096409 A1 | | 4/2015 | Lukes et al. |

\* cited by examiner

US 10,655,707 B2

GEARBOX FOR AGRICULTURAL AND INDUSTRIAL VEHICLES

CROSS-REFERENCE TO RELATED APPLICATIONS

This application is the U.S. National Phase Application of PCT/EP2016/059612, filed Apr. 29, 2016, which claims priority from IT 102015000001357712, filed Apr. 30, 2015, the contents of which applications are incorporated herein by reference in their entireties for all purposes.

BACKGROUND OF THE INVENTION

The present invention relates to a gearbox for agricultural and industrial vehicles, of the type comprising a double clutch, a plurality of pairs of toothed wheels and a plurality of engaging devices.

That type of gearbox is also generally referred to as a dual clutch or DCT (dual clutch transmission) and an example of a gearbox of this type is described in WO2005/021999.

Those gearboxes allow switching of a plurality of transmission ratios without any interruption of the torque transmitted. Usually, they are composed of two engaged transmission shafts which can be selectively connected by means of respective clutches to the input shaft of the main movement. The two engaged transmission shafts are often arranged coaxially one inside the other; the outermost shaft is therefore hollow and the two actuation clutches are arranged at an end of the gearbox, in the region of the input shaft for main movement.

Therefore, the two shafts are connected to a first and a second partial gearbox, the first of which operates, for example, the odd gear stages (for example, 1, 3, 5, 7) while the second one operates the even gear stages (for example, 2, 4, 6, 8). There is further provided an actuation shaft which is selectively connected by means of a first connection to the first input transmission shaft or by means of a second connection to the second input transmission shaft. When shifting from one gear to the successive higher or lower gear, one of those connections is opened and the other is simultaneously closed so that the drive torque can be transferred without interruption of the traction power from one partial gearbox to the other.

Disadvantages of those solutions with respect to other continuous transmission gearbox architectures involve the greater dimension in terms of length and the structural complexity relative to the construction of hollow shafts rotating at high speeds. In order to contain the axial dimensions of the gearbox, there has been configured a particular arrangement of the actuation shaft and the relevant connections as described in WO2006/084555. That solution allows a reduction in the number of rotation axes of the various components of the gearbox but it is still relatively bulky and has quite a complex construction. Furthermore, that structure, similarly to other known structures, does not allow a simple arrangement of a power take-off, unless the dimensions are sacrificed.

Another transmission of this type is described in U.S. Pat. No. 4,777,837. That transmission is also bulky and requires for operation at least three separate shafts which are spaced apart from each other.

The problem of the dimensions is partially solved by the transmission described in EP2126409, in the name of the same Applicant. However, it would be desirable to obtain a transmission which has dimensions which are further reduced and which is particularly efficient during ploughing operations and transport on roads.

BRIEF SUMMARY OF THE INVENTION

An object of the invention is to construct a gearbox of the DCT type, characterized by a high level of compactness and structural simplicity. Another object is to construct a gearbox which has particularly efficient characteristics under conditions of greater use, both in fields and on roads. In addition, an object of the present invention is also to provide a transmission which allows the provision of a power take-off without necessarily having to compromise the compactness of the structure.

This object is achieved by means of a gearbox constructed in accordance with the appended claims.

BRIEF DESCRIPTION OF THE DRAWINGS

The features and advantages of the invention will be better appreciated from the detailed description of a preferred embodiment thereof which is illustrated by way of non-limiting example with reference to the appended drawings, in which.

DETAILED DESCRIPTION OF PREFERRED EMBODIMENTS

Figure 1:
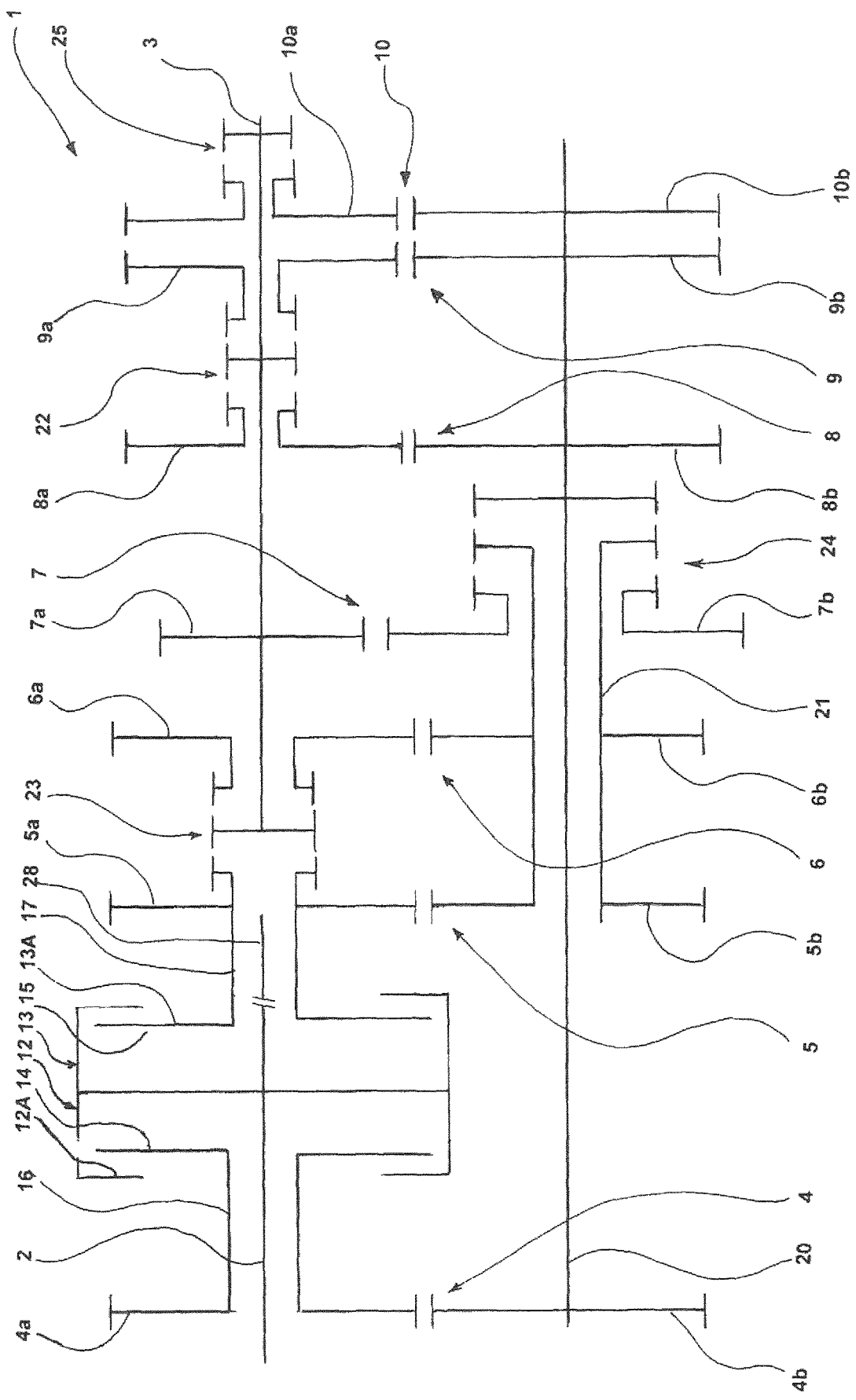
FIG. 1 is a schematic view of the gearbox of this invention.

In the Figures, the reference 1 indicate as whole a double clutch gearbox for motor vehicles, particularly but not exclusively configured for applications relating to agricultural tractors. The gearbox 1 comprises an input shaft 2 and an output shaft 3 which can be connected to each other by means of preselected pairs of toothed wheels which are indicated with 4a,b, 5a,b, 6a,b, 7a,b, 8a,b, 9a,b in constant mutual engagement in accordance with states which will be described in greater detail below. Those pairs of wheels are jointly indicated by the common reference numeral without an alphabetical index (for example, the wheels 4a,b are together designated 4).

The input shaft 2 is connected so as to be rotationally integral to both the respective pulling portions 12A, 13A of a first and a second clutch 12, 13, the driven portions 14, 15 of which are connected to a respective first and second transmission shaft 16, 17.

The first and second clutches 12, 13 are arranged in a position between the first and second transmission shafts 16, 17. The first transmission shaft 16 is constructed to be hollow so as to allow the input shaft 2 to extend in a manner coaxial and internal with respect thereto. Furthermore, the second transmission shaft 17 is also hollow.

Figure 2:
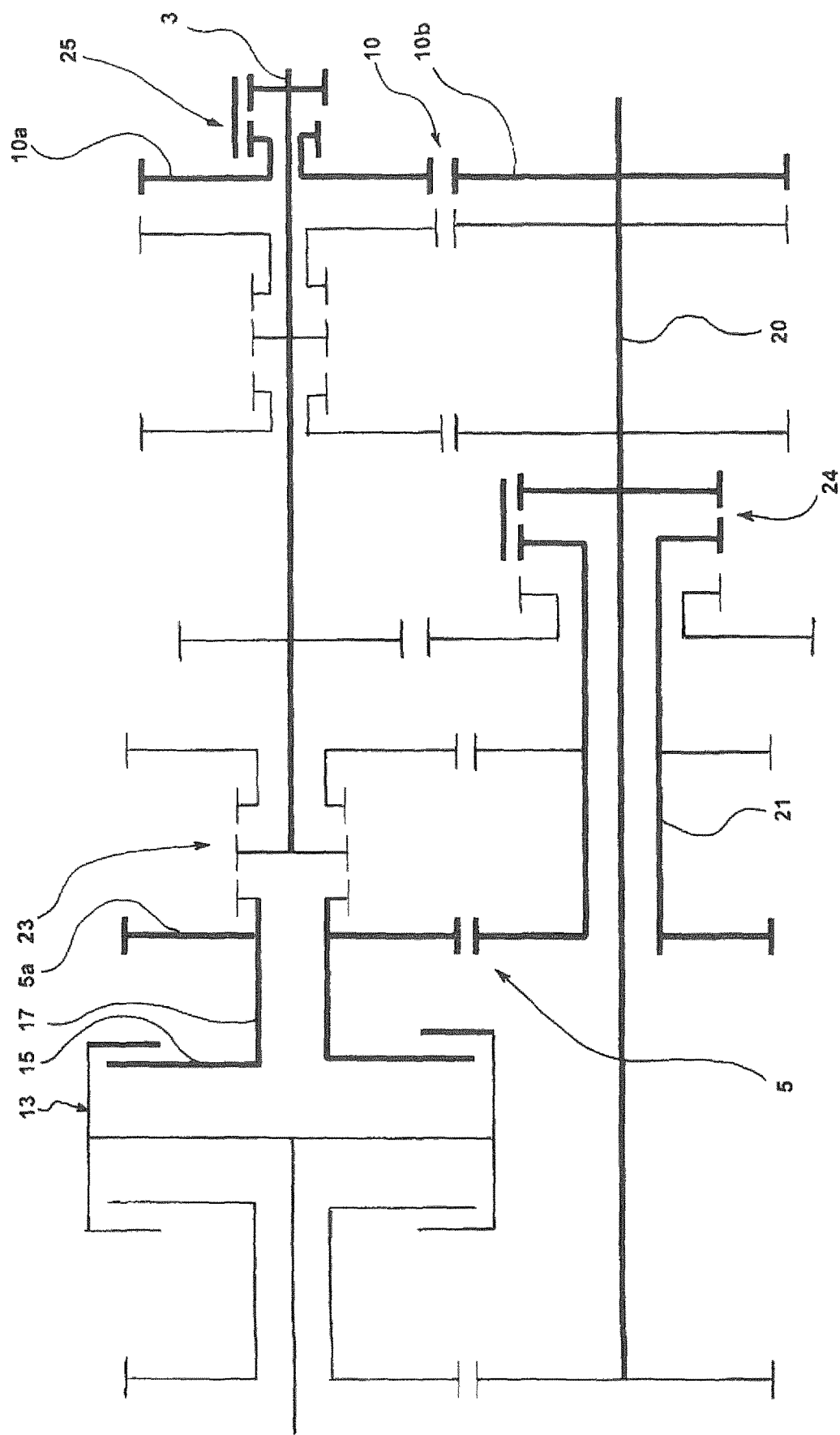
FIGS. 2 to 9 are views of the gearbox of FIG. 1 in various gear stages.
Figure 3:
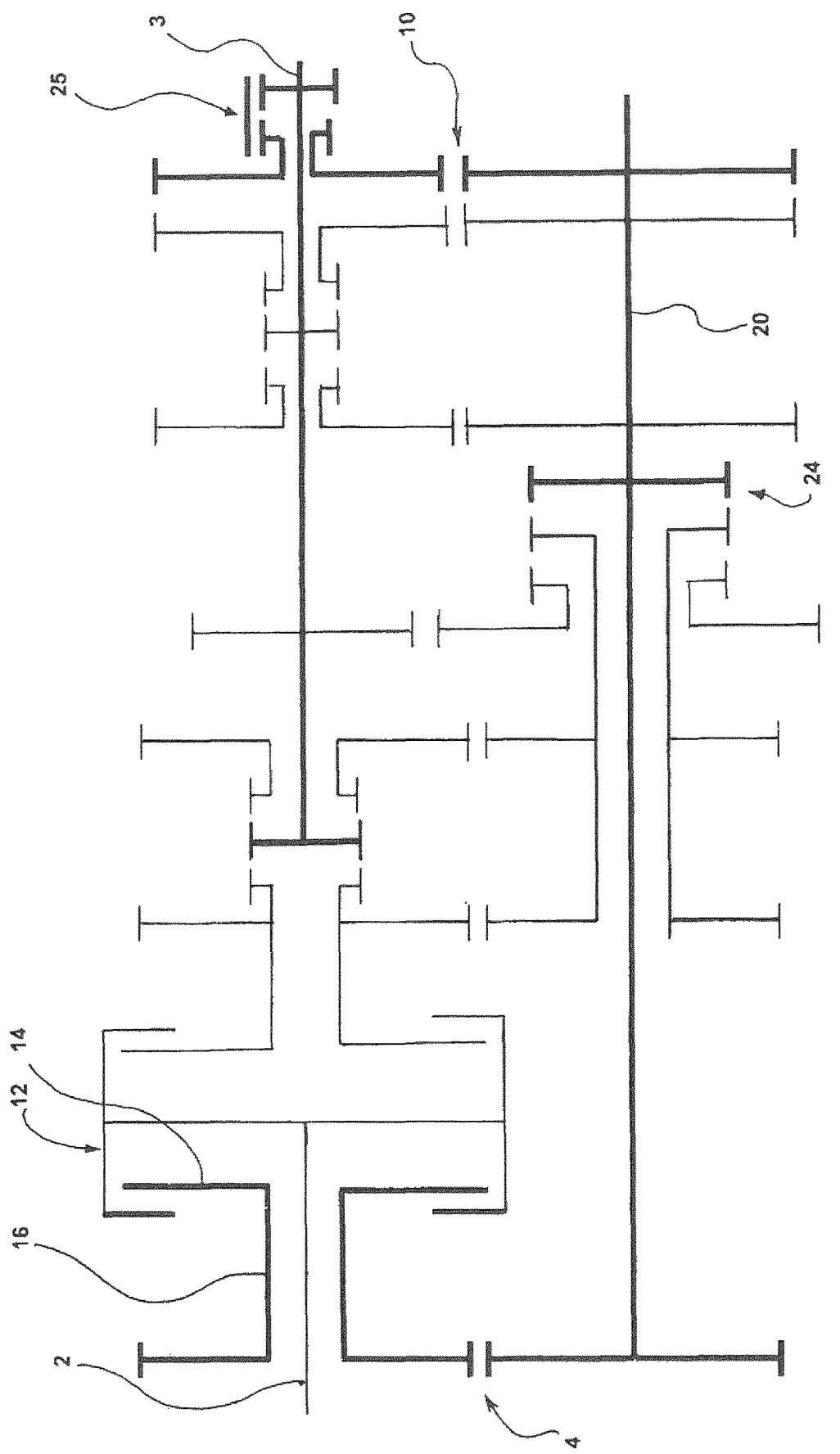
Figure 4:
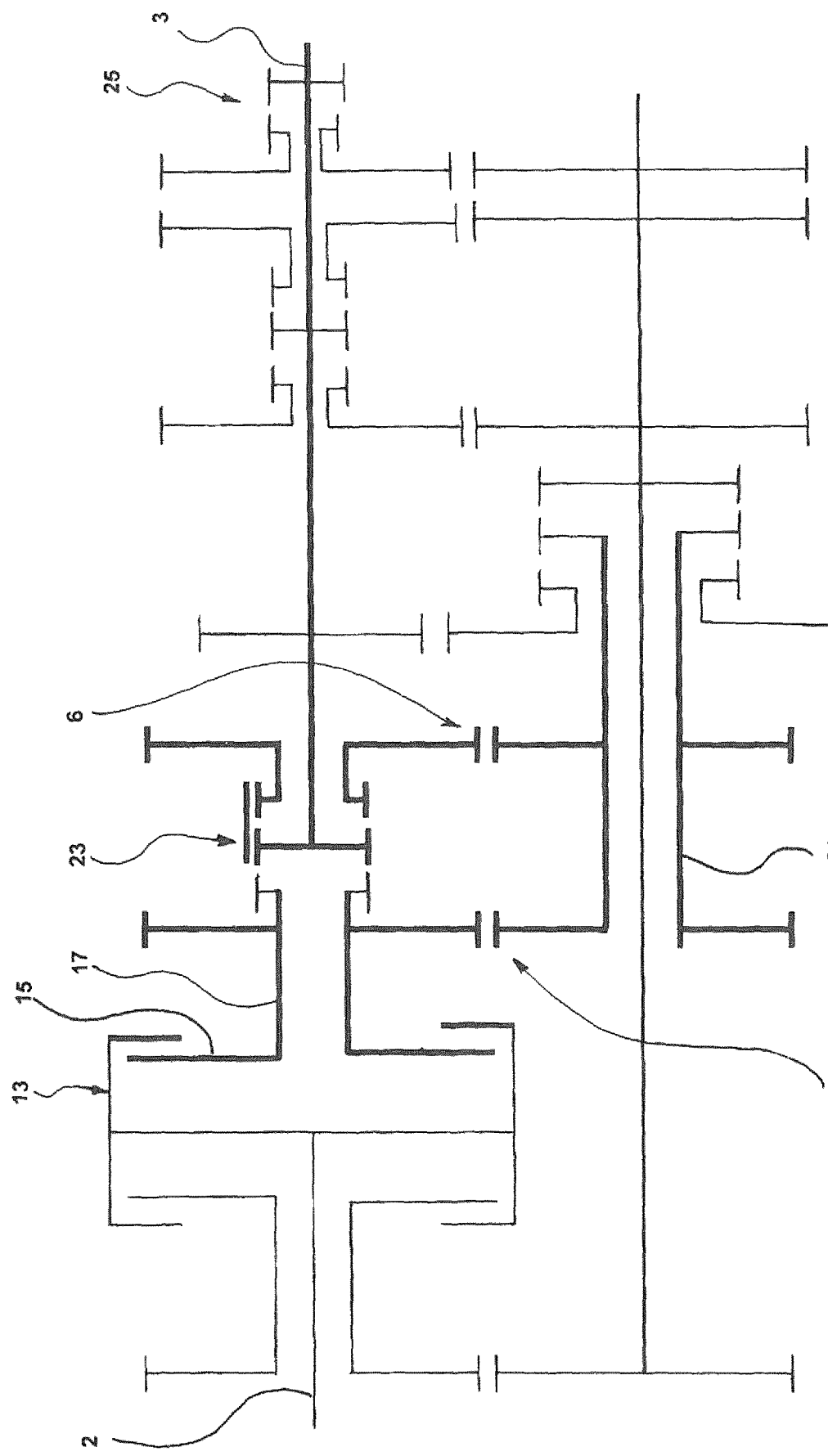
Figure 5:
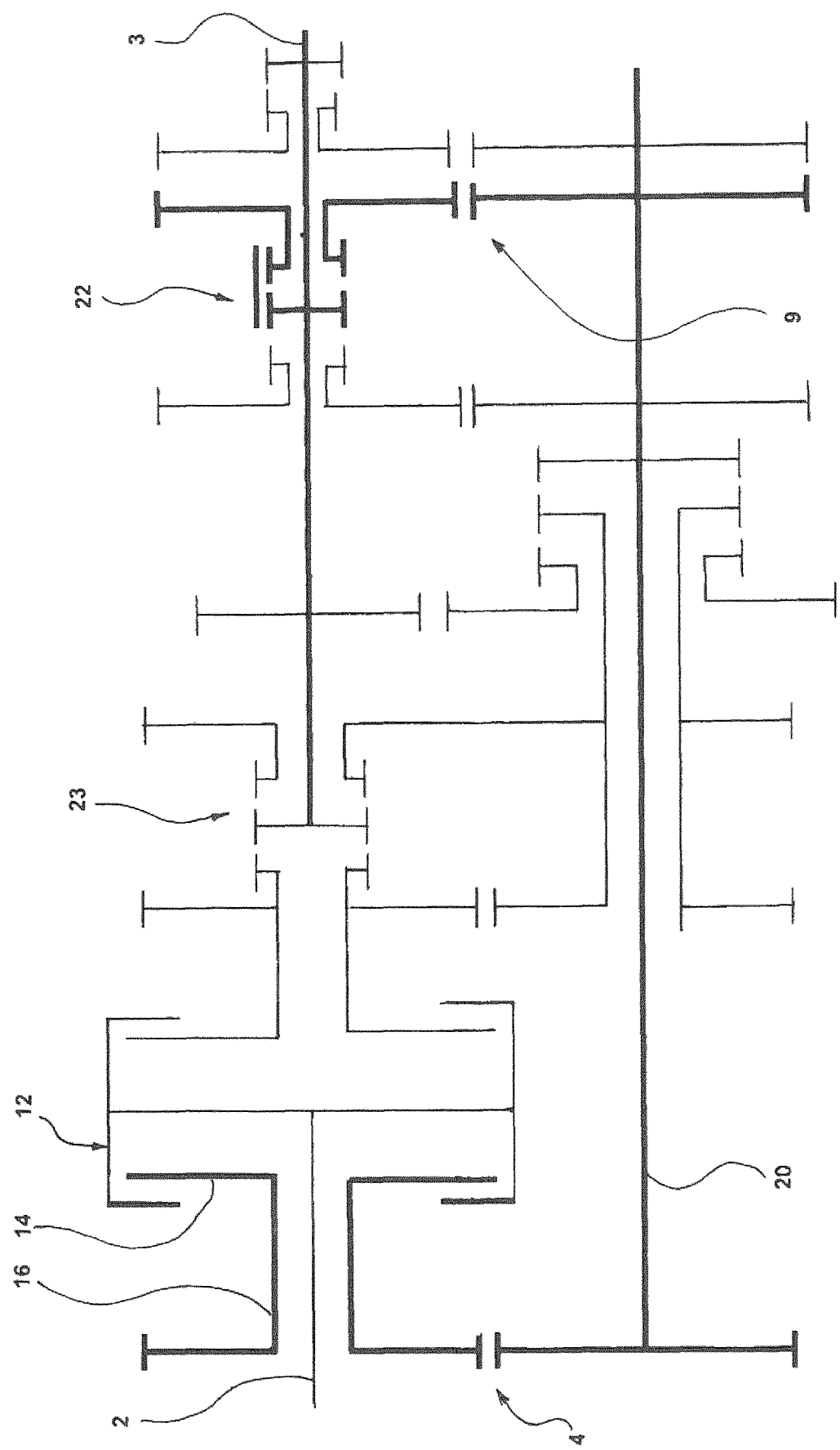
Figure 6:
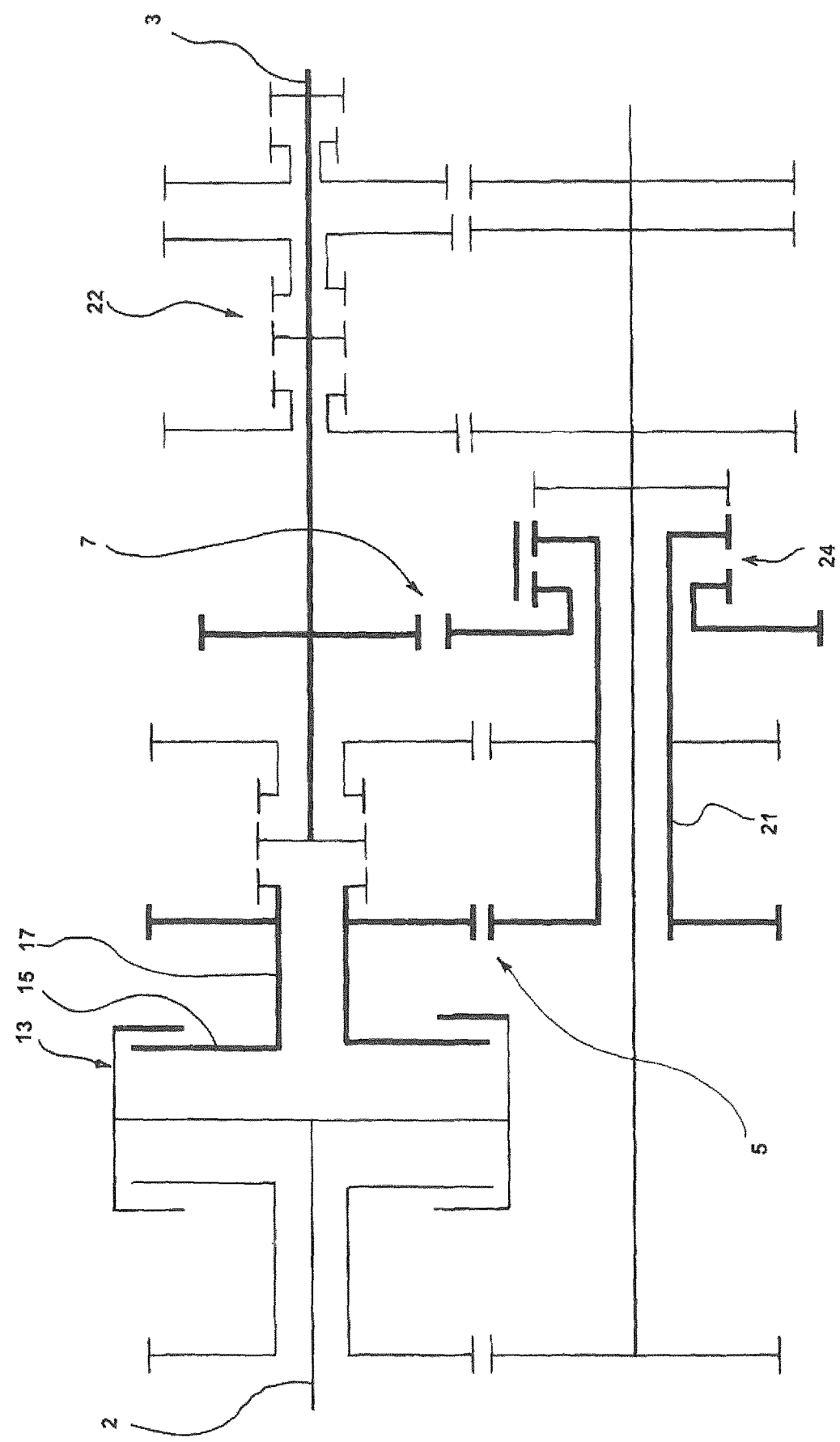
Figure 7:
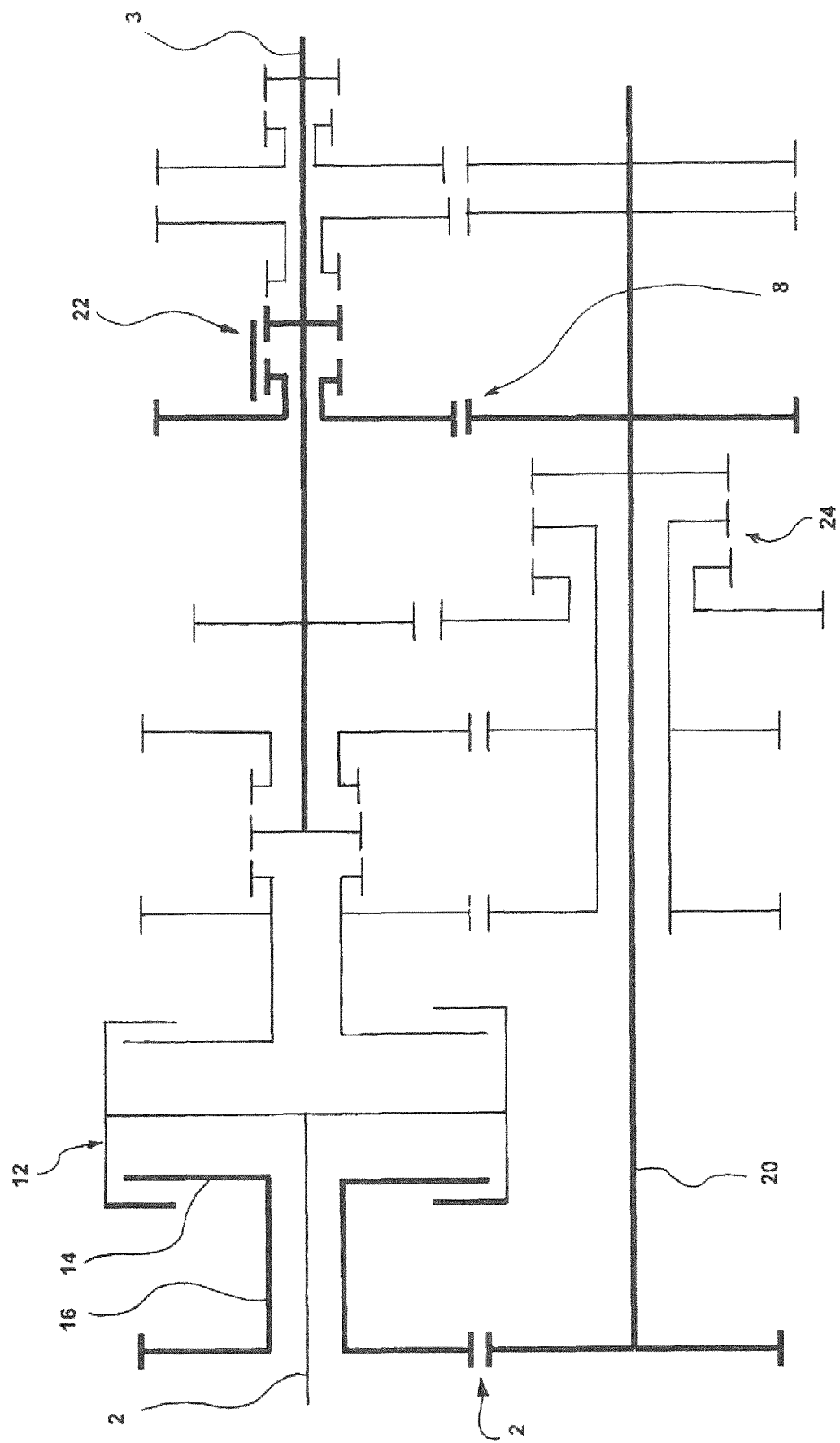
Figure 8:
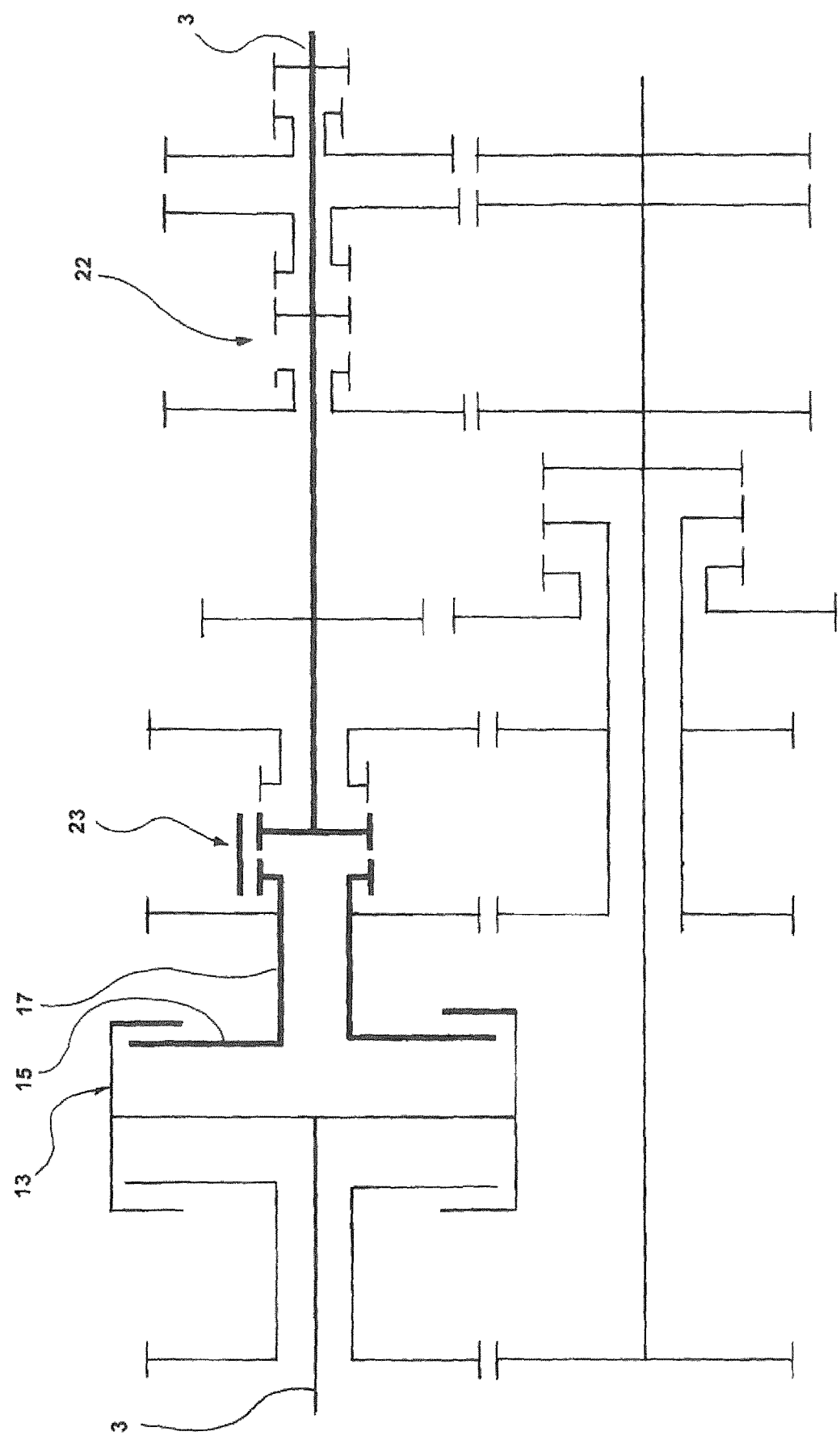
Figure 9:
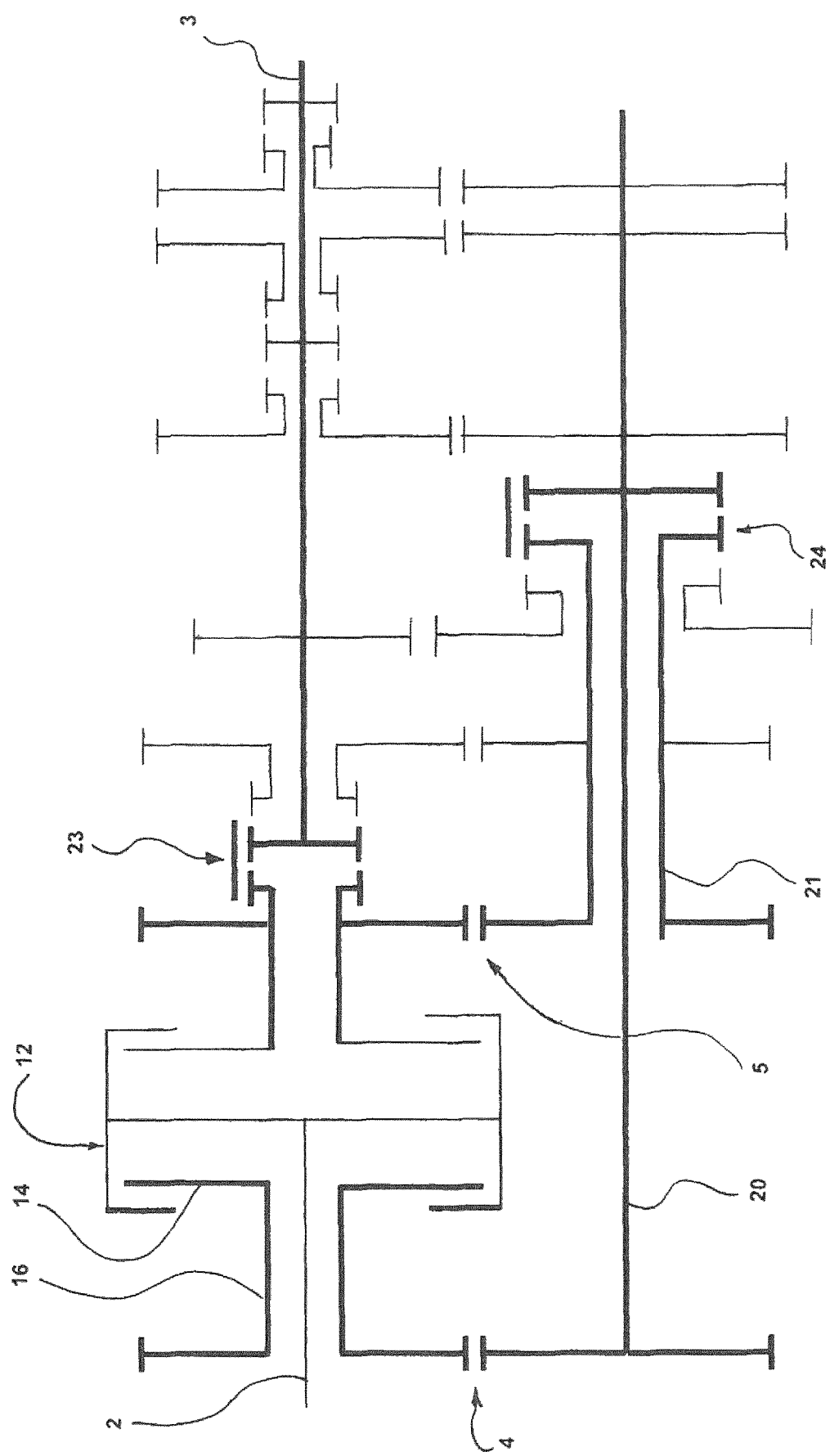

In this manner, the gearbox according to the present invention may comprise a power take-off shaft 28 which is connected to a pulling member for power take-off as the pulling portion of the clutches 12, 13 and may have that power take-off shaft extending coaxially inside the second input transmission shaft 17. In the diagrams of FIGS. 2 to 9 which describe the operation of the gearbox, the power take-off shaft 28 has been omitted for clarity of illustration.

The gearbox according to the present invention further comprises a first intermediate shaft 20 which can be connected to the first transmission shaft 16 and the output shaft 3 by means of a first plurality of pairs of toothed wheels 4a, 4b, 8a, 8b, 9a, 9b, 10a, 10b. Preferably, a first pair of toothed wheels 4a, 4b connects the first transmission shaft 16 and the first intermediate shaft 20 and is arranged in the region of an axial end of those shafts. According to a preferred embodiment, two pairs of toothed wheels 8a, 8b, 9a, 9b connect the first intermediate shaft 20 and the output shaft 3.

There is further present a second intermediate shaft 21 which can be connected to the second transmission shaft 17 and to the output shaft 3 by means of a second plurality of pairs of toothed wheels 5a, 5b, 6a, 6b.

The first intermediate shaft 20 extends coaxially inside the second intermediate shaft 21, which is constructed in the form of a hollow shaft.

The gearbox further comprises a respective first and second engaging or selecting device 22, 23 in order to connect the respective intermediate shaft to the output shaft 3 by means of a preselected pair of wheels 5, 6 or 8, 9 of the first or second pluralities of pairs, respectively.

The first and the second engaging devices 22, 23 are coaxial with respect to the output shaft 3. Furthermore, the first engaging device is preferably facing the second transmission shaft 17.

Furthermore, a toothed wheel 5a of the second plurality of wheels 5a, 5b, 6a, 6b associated with the second engaging device 23 is rotationally integral in terms of rotation to the second transmission shaft 17. In this manner, when the second engaging device 23 connects the output shaft 3 to the transmission shaft 17, the transmission of the movement is brought about without the introduction of the power via toothed wheels, thereby bringing about the condition of direct drive.

The first engaging device 22 is also coaxial with the output shaft 3.

The gearbox according to the present invention further comprises a third engaging device 24 in order to alternately connect the second intermediate shaft 21 to the first intermediate shaft 20 or to the output shaft 3.

The third engaging device 24 is further coaxial with the first and second intermediate shafts 20, 21 and is interposed in the axial direction between the first and second engaging devices 22, 23.

The above-described structure advantageously allows prevention of a superimposition between engaging devices, allowing a substantial reduction of dimensions.

That configuration allows the production of a direct drive gear, thereby making the transmission particularly efficient under the conditions in which it is used. Furthermore, as will be seen below, in the present invention that direct gear corresponds to the seventh gear, typically used during ploughing operations and transport on roads, which will therefore benefit from high efficiency.

According to a preferred embodiment, the gearbox according to the present invention further comprises a fourth engaging device 25 which is also preferably arranged to be coaxial with respect to the output shaft 3.

The fourth engaging device 25 preferably allows a connection of the first intermediate shaft 20 to the output shaft 3 by means of an additional pair of wheels 10. Preferably, the fourth engaging device 25 is arranged in the region of an axial end of the output shaft 3 opposite the pair 4 of toothed wheels. It will be noted that the first and second clutches 12, 13 are arranged in a position between the input transmission shafts 16, 17, which makes the gearbox of this invention advantageously compact in the axial direction. The transmission lines further extend along only two axes which also makes the gearbox 1 compact in the transverse direction.

The compactness of the structure is also promoted by the fact that the pair of toothed wheels associated with the first engaging device 22 are arranged in an axially opposite position with respect to the pair of wheels 4.

This is also brought about as a result of the fact that the input shaft 2 extends coaxially inside the first transmission shaft 16, which is constructed in the form of a hollow shaft.

According to a preferred embodiment, there is finally provided, though not illustrated, an inverter device which is known per se for driving the vehicle in reverse gear.

With reference to FIGS. 2 to 9, the operation of the gearbox of this invention is as follows.

In first gear (FIG. 2), the clutch 13 is engaged while the clutch 14 is disengaged.

The first and second engaging devices 22, 23 are open while the third engaging device 24 is closed so as to make integral the intermediate shaft 20 to the intermediate shaft 21, while the fourth engaging device 25 is closed so that the output shaft 3 receives movement from the first intermediate shaft 20 via the pair of wheels 10.

The shift from the first gear to the second gear (FIG. 3) is brought about when the second clutch 13 is disengaged and, at the same time, the first clutch 12 is engaged. The change of transmission ratio is produced with complete graduality and without any interruption of the torque transmitted. The flow is the one illustrated in the Figure.

In order to shift from the second gear to the third gear (FIG. 4), the third engaging device 24 is opened and the second engaging device 23 is preselected so as to connect the output shaft 3 and the intermediate transmission shaft 21 by means of the pair of wheels 6. The change of transmission ratio is produced by disengaging the first clutch 12 and, at the same time, engaging the second clutch 13. Subsequently, the fourth engaging device 25 is opened, producing the flow illustrated in the Figure.

In order to shift from the third gear to the fourth gear (FIG. 5), there is preselected the first engaging device 22 in order to close the connection between the first intermediate shaft 20 and the output shaft 3 by means of the pair of wheels 9 and therefore the second clutch 13 is disengaged and, at the same time, the first clutch 12 is engaged. The flow is the one illustrated in the Figure.

In order to shift from the fourth gear to the fifth gear (FIG. 6), the third engaging device 24 is preselected in order to close the connection between the second intermediate shaft 21 and the output shaft 3 and the first engaging device 23 is opened. When the first clutch 12 is disengaged and, at the same time, the second clutch is engaged, there is the desired change of transmission ratio. The flow is the one illustrated in the Figure.

In order to shift from the fifth gear to the sixth gear (FIG. 7), the first engaging device 22 is preselected in order to close the connection between the first intermediate shaft 20 and the output shaft 3 by means of the pair of wheels 8. The second clutch 13 is disengaged and, at the same time, the first clutch 12 is engaged. The flow is the one illustrated in the Figure.

In order to shift from the sixth gear to the seventh gear (FIG. 8), the third engaging device 24 is opened and the first engaging device 23 is preselected.

When the first clutch 12 is disengaged and, at the same time, the second clutch 13 is engaged, there is the desired change of transmission ratio. The flow is the one illustrated in the Figure. It is therefore evident that there is a direct drive between the input shaft and the output shaft.

In order to shift from the seventh gear to the eighth gear (FIG. 9), the third engaging device 24 is preselected in order to close the connection between the first intermediate shaft 20 and the second intermediate shaft 21.

When the second clutch 13 is disengaged and, at the same time, the first clutch 12 is engaged, there is the desired change of transmission ratio. The flow is the one illustrated in the Figure.

The invention thereby solves the problem proposed resulting in a number of advantages over the previous known technical solutions.

In particular, in addition to the advantages already set out above, it is also found that:

the seventh gear is direct, with maximum output, which is a particularly advantageous aspect because it is typically used in the gear for ploughing and transport on roads;

the configuration is suitable for being used in transmissions which require compact dimensions because it does not have superimposed engaging devices;

a minimum number of engaging devices are activated during gear change.

The invention claimed is:

1. A gearbox (1) for agricultural and industrial motor vehicles comprising:

an input shaft and an output shaft;

a first clutch and a second clutch, each having a pulling portion and a pulled portion, of which the respective pulling portions are connected with torsional coupling to the input shaft and the respective pulled portions are connected to a respective first and second transmission shaft, the first and second clutches being arranged in a position between the first and second transmission shafts, the first and second transmission shafts both being hollow with the input shaft coaxial and internal with respect to the first transmission shaft;

a first intermediate shaft connected to the first transmission shaft and to the output shaft by a first plurality of pairs of toothed wheels in mutual engagement and a second intermediate shaft connected to the second transmission shaft and to the output shaft by a second plurality of pairs of toothed wheels in mutual engagement, the first intermediate shaft extending coaxially inside the second intermediate shaft, which is constructed in the form of a hollow shaft;

a first engaging device capable of selectively connecting the first intermediate shaft to the output shaft by a specific pair of toothed wheels of the first plurality;

a second engaging device capable of selectively connecting the second intermediate shaft to the output shaft by a specific pair of toothed wheels of the second plurality;

a third engaging device capable of selectively connecting the second intermediate shaft to the first intermediate shaft and, in alternative, the second intermediate shaft to the output shaft;

wherein the first engaging device is coaxial with the output shaft and a toothed wheel of the first plurality of wheels is rotationally integral with respect to the second transmission shaft, the second engaging device also being coaxial with the output shaft and the third engaging device being coaxial with the first and second intermediate shafts and being interposed in an axial position between the first and second engaging devices.

2. A gearbox according to claim 1, wherein a pair of wheels for connection between the first transmission shaft and the first intermediate shaft are arranged in opposing positions in an axial direction with respect to the first engaging device.

3. A gearbox according to claim 1, including a power take-off shaft and in which the power take-off shaft extends coaxially inside the second input transmission shaft, which is constructed in the form of a hollow shaft.

4. A gearbox according to claim 1, comprising a fourth engaging device for connecting the output shaft to the first intermediate shaft in rotation by respective pairs of wheels.

5. A gearbox according to claim 4, wherein the fourth engaging device is coaxial with the output shaft.

* * * * *